(12) United States Patent
Hughes

(10) Patent No.: US 8,418,233 B1
(45) Date of Patent: Apr. 9, 2013

(54) RULE BASED EXTENSIBLE AUTHENTICATION

(75) Inventor: John Robert Hughes, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 1293 days.

(21) Appl. No.: 11/258,551

(22) Filed: Oct. 24, 2005

Related U.S. Application Data

(60) Provisional application No. 60/703,624, filed on Jul. 29, 2005.

(51) Int. Cl.
*G06F 7/04* (2006.01)
*G06F 15/16* (2006.01)
*G06F 17/30* (2006.01)
*H04L 29/06* (2006.01)

(52) U.S. Cl. ............ 726/5; 726/11; 713/155; 713/153

(58) Field of Classification Search ............ 726/5, 11, 726/13; 713/155, 154, 153
See application file for complete search history.

(56) References Cited

U.S. PATENT DOCUMENTS

| | | |
|---|---|---|
| 3,689,872 A | 9/1972 | Sieracki |
| 3,768,726 A | 10/1973 | Hale et al. |
| 5,319,638 A | 6/1994 | Lin |
| 5,553,242 A | 9/1996 | Russell et al. |
| 5,610,905 A | 3/1997 | Murthy et al. |
| 5,825,890 A | 10/1998 | Elgamal et al. |
| 5,898,837 A | 4/1999 | Guttman et al. |
| 5,941,988 A | 8/1999 | Bhagwat et al. |
| 6,023,722 A | 2/2000 | Colyer |
| 6,052,785 A | 4/2000 | Lin et al. |
| 6,061,454 A | 5/2000 | malik et al. |
| 6,182,139 B1 | 1/2001 | Brendel |
| 6,223,287 B1 | 4/2001 | Douglas et al. |
| 6,226,687 B1 | 5/2001 | Harriman et al. |
| 6,253,226 B1 | 6/2001 | Chidambaran et al. |
| 6,298,380 B1 | 10/2001 | Coile et al. |
| 6,367,009 B1 | 4/2002 | Davis et al. |
| 6,370,584 B1 | 4/2002 | Bestavros et al. |
| 6,411,986 B1 | 6/2002 | Susai et al. |
| 6,434,618 B1 | 8/2002 | Cohen et al. |
| 6,584,567 B1 | 6/2003 | Bellwood et al. |
| 6,590,588 B2 | 7/2003 | Lincke et al. |

(Continued)

OTHER PUBLICATIONS

Freier, Alan et al., "The SSL Protocol Version 3.0", IETF, Internet Draft, 62 pages, Nov. 18, 1996.

(Continued)

*Primary Examiner* — David Garcia Cervetti
(74) *Attorney, Agent, or Firm* — Frommer Lawrence & Haug LLP; Jamie L. Wiegand

(57) ABSTRACT

A system, apparatus, and method are directed to managing access to a resource using rule-based deep packet extractions of a credential. A network device, such as a traffic management device, is situated between a client device and a server device. When the client device sends a request for a resource, the request is intercepted by the network device. The network device may employ a multi-layer deep packet extraction of the credential from the request. The network device may then use the credential to determine whether the request enabled to access the resource. Based, in part, on a variety of rules, the network device may deny access, enable access, route the request to a different server, or the like. In one embodiment, the network device may receive a rule from another device that directs the network device to request a different credential.

27 Claims, 3 Drawing Sheets

U.S. PATENT DOCUMENTS

| | | |
|---|---|---|
| 6,629,163 B1 | 9/2003 | Balassanian |
| 6,643,701 B1 | 11/2003 | Aziz et al. |
| 6,650,640 B1 | 11/2003 | Muller et al. |
| 6,654,701 B2 | 11/2003 | Hatley |
| 6,668,327 B1 * | 12/2003 | Prabandham et al. ............ 726/4 |
| 6,674,717 B1 | 1/2004 | Duong-van et al. |
| 6,681,327 B1 | 1/2004 | Jardin |
| 6,697,363 B1 | 2/2004 | Carr |
| 6,718,388 B1 | 4/2004 | Yarborough et al. |
| 6,754,662 B1 | 6/2004 | Li |
| 6,754,831 B2 | 6/2004 | Brownell |
| 6,760,782 B1 | 7/2004 | Swales |
| 6,763,384 B1 | 7/2004 | Gupta et al. |
| 6,766,373 B1 | 7/2004 | Beadle et al. |
| 6,768,716 B1 | 7/2004 | Abel et al. |
| 6,768,726 B2 | 7/2004 | Dorenbosch et al. |
| 6,789,203 B1 | 9/2004 | Belissent |
| 6,792,461 B1 | 9/2004 | Hericourt |
| 6,799,276 B1 | 9/2004 | Belissent |
| 6,829,238 B2 | 12/2004 | Tokuyo et al. |
| 6,831,923 B1 | 12/2004 | Laor et al. |
| 6,842,462 B1 | 1/2005 | Ramjee et al. |
| 6,854,117 B1 | 2/2005 | Roberts |
| 6,895,443 B2 | 5/2005 | Aiken |
| 6,928,082 B2 | 8/2005 | Liu et al. |
| 6,934,260 B1 | 8/2005 | Kanuri |
| 6,934,848 B1 * | 8/2005 | King et al. ............ 713/182 |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,990,592 B2 | 1/2006 | Richmond et al. |
| 7,023,804 B1 | 4/2006 | Younes et al. |
| 7,047,315 B1 | 5/2006 | Srivastava |
| 7,051,330 B1 | 5/2006 | Kaler et al. |
| 7,069,438 B2 * | 6/2006 | Balabine et al. ............ 713/168 |
| 7,103,045 B2 | 9/2006 | Lavigne et al. |
| 7,113,993 B1 | 9/2006 | Cappiello et al. |
| 7,139,792 B1 | 11/2006 | Mishra et al. |
| 7,139,811 B2 | 11/2006 | Lev Ran et al. |
| 7,181,493 B2 * | 2/2007 | English et al. ............ 709/204 |
| 7,215,637 B1 | 5/2007 | Ferguson et al. |
| 7,231,445 B1 | 6/2007 | Aweya et al. |
| 7,231,657 B2 * | 6/2007 | Honarvar et al. ............ 726/2 |
| 7,254,639 B1 | 8/2007 | Siegel et al. |
| 7,280,471 B2 | 10/2007 | Rajagopal et al. |
| 7,287,077 B2 * | 10/2007 | Haugh et al. ............ 709/225 |
| 7,313,627 B1 | 12/2007 | Noble |
| 7,315,513 B2 | 1/2008 | McCann et al. |
| 7,321,926 B1 | 1/2008 | Zhang et al. |
| 7,350,229 B1 * | 3/2008 | Lander ............ 726/8 |
| 7,362,762 B2 | 4/2008 | Williams, Jr. et al. |
| 7,421,515 B2 | 9/2008 | Marovich |
| 7,463,637 B2 * | 12/2008 | Bou-Diab et al. ............ 370/401 |
| 7,484,011 B1 | 1/2009 | Agasaveeran et al. |
| 7,496,750 B2 * | 2/2009 | Kumar et al. ............ 713/154 |
| 7,571,313 B2 * | 8/2009 | Messerges et al. ............ 713/156 |
| 7,586,851 B2 * | 9/2009 | Panigrahy et al. ............ 370/252 |
| 7,596,137 B2 * | 9/2009 | Bennett ............ 370/389 |
| 7,619,983 B2 * | 11/2009 | Panigrahy ............ 370/252 |
| 7,623,468 B2 * | 11/2009 | Panigrahy et al. ............ 370/252 |
| 7,624,436 B2 * | 11/2009 | Balakrishnan et al. ............ 726/13 |
| 7,711,857 B2 | 5/2010 | Balassanian |
| 8,009,566 B2 | 8/2011 | Zuk et al. |
| 2001/0032254 A1 | 10/2001 | Hawkins |
| 2001/0049741 A1 | 12/2001 | Skene et al. |
| 2002/0025036 A1 | 2/2002 | Sato |
| 2002/0055980 A1 | 5/2002 | Goddard |
| 2002/0059428 A1 | 5/2002 | Susai et al. |
| 2002/0073223 A1 | 6/2002 | Darnell et al. |
| 2002/0085587 A1 | 7/2002 | Mascolo |
| 2002/0107903 A1 | 8/2002 | Richter et al. |
| 2002/0126671 A1 | 9/2002 | Ellis et al. |
| 2002/0133586 A1 | 9/2002 | Shanklin et al. |
| 2002/0147916 A1 * | 10/2002 | Strongin et al. ............ 713/193 |
| 2002/0169980 A1 | 11/2002 | Brownell |
| 2003/0018827 A1 | 1/2003 | Guthrie et al. |
| 2003/0043755 A1 | 3/2003 | Mitchell |
| 2003/0050974 A1 | 3/2003 | Mani-Meitav et al. |
| 2003/0061256 A1 | 3/2003 | Mathews et al. |
| 2003/0097484 A1 | 5/2003 | Bahl |
| 2003/0110230 A1 | 6/2003 | Holdsworth et al. |
| 2003/0126029 A1 | 7/2003 | Dastidar et al. |
| 2003/0139183 A1 | 7/2003 | Rantalainen |
| 2003/0154406 A1 * | 8/2003 | Honarvar et al. ............ 713/201 |
| 2003/0169859 A1 | 9/2003 | Strathmeyer et al. |
| 2003/0177267 A1 | 9/2003 | Orava et al. |
| 2003/0217171 A1 | 11/2003 | Von Stuermer et al. |
| 2003/0223413 A1 | 12/2003 | Guerrero |
| 2004/0006638 A1 | 1/2004 | Oberlander et al. |
| 2004/0008629 A1 | 1/2004 | Rajagopal et al. |
| 2004/0008664 A1 | 1/2004 | Takahashi et al. |
| 2004/0008728 A1 | 1/2004 | Lee |
| 2004/0010473 A1 | 1/2004 | Hsu et al. |
| 2004/0037322 A1 | 2/2004 | Sukonik et al. |
| 2004/0052257 A1 | 3/2004 | Abdo et al. |
| 2004/0088585 A1 * | 5/2004 | Kaler et al. ............ 713/201 |
| 2004/0148425 A1 | 7/2004 | Haumont et al. |
| 2004/0193513 A1 | 9/2004 | Pruss et al. |
| 2004/0225810 A1 | 11/2004 | Hiratsuka |
| 2005/0060295 A1 * | 3/2005 | Gould et al. ............ 707/3 |
| 2005/0063303 A1 | 3/2005 | Samuels et al. |
| 2005/0063307 A1 | 3/2005 | Samuels et al. |
| 2005/0074007 A1 | 4/2005 | Samuels et al. |
| 2005/0108420 A1 | 5/2005 | Brown et al. |
| 2005/0132060 A1 | 6/2005 | Mo et al. |
| 2005/0135436 A1 | 6/2005 | Nigam et al. |
| 2005/0144278 A1 | 6/2005 | Atamaniouk |
| 2005/0187979 A1 | 8/2005 | Christensen et al. |
| 2005/0216555 A1 * | 9/2005 | English et al. ............ 709/204 |
| 2005/0238010 A1 * | 10/2005 | Panigrahy et al. ............ 370/389 |
| 2005/0238011 A1 * | 10/2005 | Panigrahy ............ 370/389 |
| 2005/0238012 A1 * | 10/2005 | Panigrahy et al. ............ 370/389 |
| 2005/0238022 A1 * | 10/2005 | Panigrahy ............ 370/392 |
| 2005/0265235 A1 | 12/2005 | Accapadi et al. |
| 2005/0271048 A1 * | 12/2005 | Casey ............ 370/389 |
| 2006/0005008 A1 * | 1/2006 | Kao ............ 713/153 |
| 2006/0020598 A1 | 1/2006 | Shoolman et al. |
| 2006/0026290 A1 | 2/2006 | Pulito et al. |
| 2006/0029062 A1 * | 2/2006 | Rao et al. ............ 370/389 |
| 2006/0029063 A1 * | 2/2006 | Rao et al. ............ 370/389 |
| 2006/0029064 A1 * | 2/2006 | Rao et al. ............ 370/389 |
| 2006/0036747 A1 | 2/2006 | Galvin et al. |
| 2006/0037071 A1 * | 2/2006 | Rao et al. ............ 726/13 |
| 2006/0123226 A1 * | 6/2006 | Kumar et al. ............ 713/154 |
| 2006/0153228 A1 | 7/2006 | Stahl et al. |
| 2006/0233166 A1 * | 10/2006 | Bou-Diab et al. ............ 370/389 |
| 2006/0235973 A1 * | 10/2006 | McBride et al. ............ 709/226 |
| 2006/0242300 A1 | 10/2006 | Yumoto et al. |
| 2006/0265689 A1 | 11/2006 | Kuznetsov et al. |
| 2006/0294366 A1 * | 12/2006 | Nadalin et al. ............ 713/156 |
| 2007/0094336 A1 | 4/2007 | Pearson |
| 2007/0121615 A1 | 5/2007 | Weill et al. |
| 2007/0153798 A1 | 7/2007 | Krstulich |
| 2007/0156919 A1 * | 7/2007 | Potti et al. ............ 709/238 |
| 2008/0034127 A1 | 2/2008 | Nishio |
| 2008/0253366 A1 | 10/2008 | Zuk et al. |
| 2009/0063852 A1 * | 3/2009 | Messerges et al. ............ 713/156 |
| 2009/0077618 A1 * | 3/2009 | Pearce et al. ............ 726/1 |

OTHER PUBLICATIONS

Dierks, T. et al., "The TLS Protocol Version 1.0", RFC 2246, 32 pages, Jan. 1999.

Housley, R. et al., "Internet X.509 Public Key Infrastructure Certificate and CRL Profile", RFC 2459, 121 pages, Jan. 1999.

Enger, R. and Reynolds, J., "FYI on a Network Management Tool Catalog: Tools for Monitoring and Debugging TCP/IP Internets and Interconnected Devices", RFC 1470, 52 pages, Jun. 1993.

Hewitt, John R. et al., "Securities Practice and Electronic Technology," Corporate Securities Series, (New York: Law Journal Seminars-Press) 1998, title page, bibliography page, pp. 4.29-4.30.

Reardon, Marguerite, "A Smarter Session Switch: Arrowpoint's CS Session Switches Boast the Brains Needed for E-Commerce," Data Communications, Jan. 1999, title page, pp. 3, 5, 18.

U.S. Appl. No. 10/172,411, Offical Communication mailed Sep. 1, 2006.

U.S. Appl. No. 10/172,411, Official Communication mailed Jun. 19, 2006.
U.S. Appl. No. 10/172,411, Official Communication mailed Oct. 18, 2007.
U.S. Appl. No. 10/172,411, Official Communication mailed Apr. 25, 2008.
U.S. Appl. No. 10/172,411, Official Communication mailed Oct. 1, 2008.
U.S. Appl. No. 10/172,411, Official Communication mailed Dec. 16, 2005.
U.S. Appl. No. 10/409,951, Official Communication mailed Jul. 17, 2008.
U.S. Appl. No. 10/409,951, Official Communication mailed Nov. 30, 2006.
U.S. Appl. No. 10/409,951, Official Communication mailed Mar. 8, 2007.
U.S. Appl. No. 10/409,951, Official Communication mailed Jan. 4, 2008.
U.S. Appl. No. 10/409,951, Official Communication mailed Aug. 24, 2007.
U.S. Appl. No. 10/409,951, Official Communication mailed Jun. 16, 2006.
Using the Universal Inspection Engine, Manual Chapter: BIG-IP Solutions Guide v4.6.2: Using the Universal Inspection Engine, 2002, 8 pgs.
Valloppillil, Vinod et al., "Cache Array Routing Protocol v1.0," Feb. 1998, 7 pages, http://icp.ircache.net/carp.txt (accessed Jul. 25, 2008).
W3C, "HTTP/1.1 and Nagle's Algorithm," visited Dec. 6, 2005, 3 pages, <http://www.w3.org/Protocols/HTTP/Performance/Nagle/>.
U.S. Appl. No. 10/719,375, Official Communication mailed Jun. 18, 2008.
U.S. Appl. No. 10/719,375, Official Communication mailed Apr. 24, 2009.
U.S. Appl. No. 10/719,375, Official Communication mailed Nov. 13, 2009.
U.S. Appl. No. 11/243,844, Official Communication mailed Oct. 18, 2008.
U.S. Appl. No. 11/243,844, Official Communication mailed Feb. 20, 2009.
U.S. Appl. No. 11/243,844, Official Communication mailed Jul. 16, 2009.
U.S. Appl. No. 11/243,844, Official Communication mailed Feb. 19, 2010.
About Computing & Technology, "Wireless/Networking, Nagle algorithm," visited Dec. 6, 2005, 2 pages, <http://compnetworking.about.com/od/tcpip/l/bldef_nagle.htm>.
Acharya et al., "Scalable Web Request Routing with MPLS", IBM Research Report, IBM Research Division, Dec. 5, 2001, 15 pages.
Australia's Academic and Research Network, "Programs and large MTU, Nagle algorithm," visited Dec. 9, 2005, 3 pages, <http://www.aarnet.edu.au/engineering/networkdesign/mtu/programming.html>.
Berners-Lee, T. et al., RFC 1945, "Hypertext Transfer Protocol—HTTP/1.0," May 1996, 60 pages.
Berners-Lee, T. et al., "Uniform Resource Identifiers (URI): Generic Syntax," IETF RFC 2396, Aug. 1998, 40 pages.
"BIG-IPa Controller With Exclusive OneConnecta Content Switching Feature Provides a Breakthrough System for Maximizing Server and Network Performance", F5 Networks, Inc., Press Release, May 8, 2001, 3 pages (accessed Jun. 4, 2002).
Bryhni et al., "A Comparison of Load Balancing Techniques for Scalable Web Servers," IEEE Network, Jul./Aug. 2000, p. 58-64.
"Consistent Hashing," Wikipedia—the free encyclopedia, 1 page, http://en.wikipedia.org/w/index.php? title=Consistent_hashing&print... (accessed Jul. 25, 2008).
"Control Plane," Wikipedia—the free encyclopedia, 4 pages, http://en.wikipedia.org/w/index.php? title=Control_plane&printable=yes (accessed Jul. 31, 2008).
"Editcap—Edit and/or translate the format of capture files," ethereal.com, 3 pages, www.ethereal.com/docs/man-pages/editcap.1.html (accessed Apr. 15, 2004).
"Ethereal—Interactively browse network traffic," ethereal.com, 29 pages, www.ethereal.com/docs/man-pages/ethereal.1.html (accessed Apr. 15, 2004).

F5 Networks Delivers Blistering Application Traffic Management Performance and Unmatched Intelligence via New Packet Velocity ASIC and BIG-IP Platforms, F5 Networks, Inc. Press Release dated Oct. 21, 2002, 3 pgs.
"FAQ: Network Intrusion Detection Systems," robertgraham.com, Mar. 21, 2000, 43 pages, www.robertgraham.com/pubs/network-intrusion-detection.html (accessed Apr. 15, 2004).
Fielding, R. et al., "Hypertext Transfer Protocol—HTTP/1.1", Network Working Group, RFC 2068, Jan. 1997, 152 pages.
Fielding, R. et al., "Hypertext Transfer Protocol—HTTP/1.1," Jun. 1999, pp. 1-176, W3 Consortium, http://www.w3.org/Protocols/rfc2616/rfc2616.html.
Fielding, R. et al., RFC 2616, "Hypertext Transfer Protocol—HTTP/1.1," Jun. 1999, 114 pages.
fifi.org, "Manpage of TCP," visited Dec. 9, 2005, 6 pages, <http://www.fifi.org/cgi-bin/man2html/usr/share/man/man7/tcp.7.gz>.
"Forwarding Plane," Wikipedia—the free encyclopedia, 5 pages, http://en.wikipedia.org/w/index.php?title=Forwarding_plane&printa... (accessed Jul. 31, 2008).
Freier, A. et al., Netscape Communications Corporation, "The SSL Protocol, Version 3.0," Mar. 1996, 60 pages.
Hinden, R. et al., "Format for Literal IPv6 Addresses in URL's," IETF RFC 2732, Dec. 1999, 5 pages.
Hochmuth, Phil, "F5, CacheFlow Pump Up Content-Delivery Lines", NetworkWorld, May 4, 2001, 3 pages, http://www.network.com/news/2001/0507cachingonline.html (accessed Jun. 1, 2005).
IP Multimedia Subsystem, http://en.wikipedia.org/w/index.php?title=IP_Multimedia_Subsyst..., accessed May 15, 2008, 8 pgs.
Jacobson, V. et al., "TCP Extensions for High Performance," May 1992, pp. 1-37, http://www.faqs.org/rfcs/rfc1323.html.
Kessler, G. et al., RFC 1739, "A Primer on Internet and TCP/IP Tools," Dec. 1994, 46 pages.
Mapp, Glenford, "Transport Protocols—What's wrong with TCP," Jan. 28, 2004, pp. 1-60, LCE Lecture at: http://www-Ice.eng.cam.ac.uk/~gem11, 4F5-Lecture4.pdf.
Nagle, J., RFC 896, "Congestion control in IP/TCP internetworks," Jan. 6, 1984, 13 pages.
"Network Management," Wikipedia—the free encyclopedia, 3 pages, http://en.wikipedia.org/w/index.php? title=Network_management&pr... (accessed Jul. 31, 2008).
"Network Sniffer," linuxmigration.com, 4 pages, www.linuxmigration.com/quickref/admin/ethereal.html (accessed Apr. 15, 2004).
Nielsen, H. F. et al., "Network Performance Effects of HTTP/1.1, CSS1, and PNG," Jun. 24, 1997, 1-19 pgs., W3 Consortium, http://www.w3.org/TR/NOTE-pipelining-970624$Id: Pipeline.html, v 1.48 Oct. 18, 1999 19:38:45 root Exp $.
OpenSSL, visited Apr. 12, 2006, 1 pg., <www.openssl.org>.
Oracle Communication and Mobility Server, Aug. 2007, http://www.oracle.com/technology/products/ocms/otn_front.html, accessed May 15, 2008, 108 pgs.
Paxson, V., RFC 2525, "Known TCP Implementation Problems," Mar. 1999, 61 pages.
Postel J., "Transmission Control Protocol," Sep. 1981, pp. 1-16, Information Sciences Institute, University of Souther California, Marina del Rey, California, http://www.faqs.org/rfcs/rfc793.html.
Rescorla, E. "SSL and TLS, Designing and Building Secure Systems", 2001, Addison-Wesley, 46 pages.
RSA Laboratories, "PKCS #1 v2.0: RSA Cryptography Standard," Oct. 1, 1998, 35 pages.
Schroeder et al., "Scalable Web ServerClustering Technologies," IEEE Network May/Jun. 2000, p. 38-45.
SearchNetworking.com, "Nagle's algorithm," visited Dec. 6, 2005, 3 pages, <http://searchnetworking.techtarget.com/sDefinition/0,,sid7_gci754347,00.html>.
Secure and Optimize Oracle 11i E-Business Suite with F5 Solutions, F5 Application Ready Network Guide, Oracle E-Business Suite 11i. Aug. 2007, 2 pgs.
Session Initiation Protocol, http://en.wikipedia.org/w/index.php?title=Session_Initiation_Protoc..., accessed May 14, 2008, 5 pgs.
Stevens, W. Richard, "TCP/IP Illustrated", vol. 1: The Protocols, Addison-Wesley Professional, Dec. 31, 1993, 17 pages.

Stevens, W., "TCP Slow Start, Congestion Avoidance, Fast Retransmit, and Fast Recovery Algorithms," Jan. 1997, pp. 1-6, Suniste.dk, http://rfc.sunsite.dk/rfc/rfc2001.html.

"Telecommunications Network," Wikipedia—the free encyclopedia, 2 pages, http://en.wikipedia.org/w/index.php?title=Telecommunications_net... (accessed Jul. 31, 2008).

"Tethereal—Dump and analyze network traffic," ethereal.com, 11 pages, www.ethereal.com/docs/man-pages/tethereal.1.html (accessed Apr. 15, 2004).

Tormasov, A. et al., "TCP/IP options for high-performance data transmission," visited Dec. 9, 2005, 4 pages, <http://builder.com.com/5100-6732-1050878.html>.

U.S. Appl. No. 11/139,061, Office Communication, mailed Feb. 5, 2009.

U.S. Appl. No. 11/139,061, Office Communication, mailed Sep. 22, 2009.

U.S. Appl. No. 11/366,367, Official Communication mailed on Feb. 11, 2009.

U.S. Appl. No. 11/366,367, Official Communication mailed on Aug. 22, 2008.

U.S. Appl. No. 10/172,411, Official Communication mailed Apr. 30, 2007.

U.S. Appl. No. 10/172,411, Official Communication mailed Nov. 13, 2006.

Official Communication for U.S. Appl. No. 12/199,768 mailed Jun. 18, 2010.

Official Communication for U.S. Appl. No. 12/199,768 mailed Nov. 22, 2010.

Official Communication for U.S. Appl. No. 12/199,768 mailed Feb. 1, 2.011.

Official Communication for U.S. Appl. No. 12/475,307 mailed Feb. 10, 2011.

Official Communication for U.S. Appl. No. 12/475,307 mailed Jul. 22, 2011.

Official Communication for U.S. Appl. No. 12/475,307 mailed Sep. 29, 2011.

* cited by examiner

RULE BASED EXTENSIBLE AUTHENTICATION

CROSS-REFERENCE TO RELATED APPLICATIONS

This application claims the benefit of U.S. Provisional Application Ser. No. 60/703,624 entitled "Rule Based Extensible Authentication," filed on Jul. 29, 2005, the benefit of the earlier filing date of which is hereby claimed under 35 U.S.C. §119 (e) and which is further incorporated herein by reference.

FIELD OF THE INVENTION

The present invention relates generally to communications security, and more particularly, but not exclusively, to a system and method for managing rule based authentication that is arranged to be extensible.

BACKGROUND OF THE INVENTION

Networked computing is becoming increasingly more important to the success of many businesses today. Networked computers provide access to a wide variety of information and services ranging from games, blog sites, and merchant websites, to mission critical services. Many of these networked computers involve server devices that are configured to perform a plurality of other activities along with their intended business related activity. Some of these other activities may include managing data redundancy, failover services, managing connections, as well as managing security activities. As the non-business related activities managed by a server device increases, the server device may become overloaded, resulting in reduced performance, effectivity, and/or throughput. Therefore, it may be desirable to minimize the amount of non-business related activities performed by a server device. Thus, it is with respect to these considerations, and others, that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
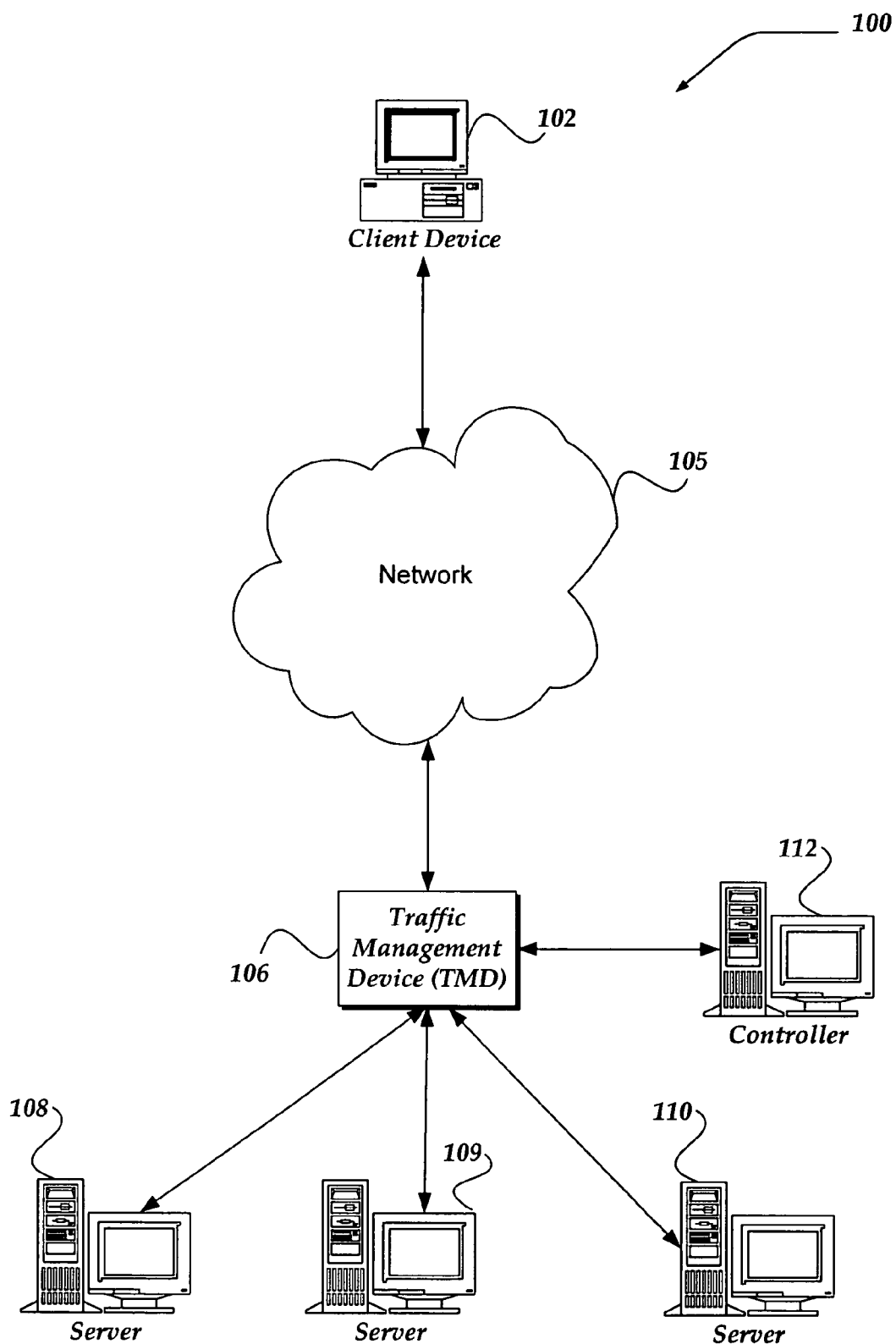
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used throughout this application, including the claims, SSL refers to SSL, TLS, and all secure communications protocols derived therefrom. The SSL protocol is described in Netscape Communications Corp, *Secure Sockets Layer (SSL) version* 3, accessible through Netscape Communications Corp. (November 1996). The TLS protocol is derived from SSL, and is described in Dierks, T., and Allen, C., "The TLS Protocol Version 1.0," RFC 2246 (January 1999), is available from the Internet Engineering Task Force (IETF). The SSL Protocol may employ a certificate. In one embodiment, the certificate is an X.509 certificate, such as those described in Request for Comments (RFC) 2459 available from the IETF.

The term 'credential' as used herein refers to data that may be verified when presented in an authentication transaction. Credentials typically are bound in some way to an entity, such as a client, server, user, or the like. Credentials may also be used to enable authorization and/or access rights for the bound entity.

In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa.

Briefly stated, the present invention is directed towards a system, method, and apparatus for managing access to a resource using rule-based deep packet credential extractions. A network device, such as a traffic management device, is situated between a client device and a server device within a networking infrastructure. When the client device sends a request for a resource towards the server device, the request may be intercepted by the network device. The network device may employ a multi-layer deep packet inspection to extract information from the request and/or a related network packet flow useable to generate a credential. In one embodiment, the credential includes a username/password combination. In another embodiment, the credential may include a digital certificate. In one embodiment, the deep packet extraction may be over several network packets. The network device may then employ various modules to determine whether the request is authentic and/or authorized to access the resource. In one embodiment, the modules include a Pluggable Authentication Module (PAM). In another embodiment, the modules may include an Apache Authentication/ Authorization/Access (AAA) module. Based, in part, on a variety of rules, the network device may deny access, may provide access to the resource, or the like. Additional checks for access may also be employed to further increase access protection through the use of a rule scripting language. In one embodiment, the network device may receive a rule from another device that directs the network device to request different credential information. In one embodiment, the network device may employ the results of the determination to route the request to another server device. Moreover, the network device may also provide the authentication information to another server device to enable access to additional resources.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client device 102, network 105, traffic management device (TMD) 106, controller 112, and servers 108-110. Client device 102 is in communication with TMD 106 through network 105. TMD 106 is in further communication with servers 108-110, and controller 112. Although not shown, TMD 106 may be in communication with servers 108-110 through a network infrastructure that is similar to network 105. For example, in one embodiment, TMD 106, controller 112, and servers 108-110 might reside within a common local area network type of infrastructure, although the invention is not constrained to such a configuration.

Generally, client device 102 may include virtually any computing device capable of connecting to another computing device and receiving information. Such devices may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client device 102 may also include other computing devices, such as personal computers, multiprocessor systems, microprocessor-based or programmable consumer electronics, network devices, and the like. As such, client device 102 may range widely in terms of capabilities and features. For example, a client device configured as a cell phone may have a numeric keypad and a few lines of monochrome LCD display on which only text may be displayed.

In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

Client device 102 also may include at least one client application that is configured to receive content from another computing device. The client application may include a capability to provide and receive textual content, graphical content, audio content, alerts, messages, and the like. Moreover, client device 102 may be further configured to communicate a message, such as through a Short Message Service (SMS), Multimedia Message Service (MMS), instant messaging (IM), interne relay chat (IRC), mIRC, Jabber, and the like, between another computing device, and the like.

In one embodiment, client device 102 may be configured such that an end-user may operate the computing device to make requests for data and/or services from other computers on the network. In one embodiment, client device 102 may employ a network interface unit (sometimes called a transceiver), such as described below, to communicate information with another computing device. Often, the requested data resides in computing devices such as servers 108-110. In one embodiment, client device 102 is a computing device that is not operated by an end-user.

Network 105 is configured to couple one computing device with another computing device. Network 105 may be enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 105 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 105 may also include an autonomous system of terminals, gateways, routers, and the like connected by wireless radio links, and the like. These connectors may be configured to move freely and randomly and organize themselves arbitrarily, such that the topology of network 105 may change rapidly.

Network 105 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, and future access networks may enable wide area coverage for mobile devices with various degrees of mobility. For example, network 105 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. In essence, network 105 may include virtually any wired and/or wireless communication mechanisms by which information may travel between one computing device and another computing device, network, and the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Servers 108-110 may include any computing device capable of communicating packets with client computer 102. Each packet may convey a piece of information. A packet may be sent for handshaking, i.e., to establish a connection or to acknowledge receipt of data. The packet may include information such as a request, a response, or the like. Generally, packets received by servers 108-110 will be formatted according to TCP/IP, but they could also be formatted using another transport protocol, such as User Datagram Protocol (UDP), Internet Control Message Protocol (ICMP), NETbeui, IPX/SPX, token ring, and the like. Moreover, the packets may be communicated between servers 108-110, TMD 106, and client device 102 employing HTTP, HTTPS, and the like.

In one embodiment, servers 108-110 are configured to operate as a website server. However, servers 108-110 are not limited to web servers, and may also operate a messaging server, a File Transfer Protocol (FTP) server, a database server, a directory server, lightweight directory access protocol (LDAP) server, a content server, and the like. Additionally, each of servers 108-110 may be configured to perform a different operation. Thus, for example, server 108 may be configured as a messaging server, while server 109 is configured as a database server. Moreover, while servers 108-110 may operate as other than a website, they may still be enabled to receive an HTTP communication.

Devices that may operate as servers 108-110 include personal computers desktop computers, multiprocessor systems, microprocessor-based or programmable consumer electronics, network PCs, servers, and the like.

TMD 106 may include virtually any device that manages network traffic. Such devices include, for example, routers, proxies, firewalls, load balancers, cache devices, devices that perform network address translation, any combination of the preceding devices, and the like. TMD 106 may be implemented using one or more personal computers, servers, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. An embodiment of a network device that could be used as TMD 106 is network device 200 of FIG. 2, configured with appropriate software. The BIG-IP® family of traffic managers, by F5 Networks of Seattle, Wash., are examples of TMDs.

TMD 106 may be configured to control a flow of data packets delivered to and forwarded from an array of servers, such as servers 108-110. TMD 106 may direct a request for a resource to a particular server based on network traffic, network topology, capacity of a server, content requested, an authentication, or authorization status, and a host of other traffic distribution mechanisms. TMD 106 may receive data packets from and transmit data packets to the Internet, an intranet, or a local area network accessible through another network. TMD 106 may recognize packets that are part of the same communication, flow, and/or stream and may perform special processing on such packets, such as directing them to the same server so that state information is maintained. TMD 106 also may support a wide variety of network applications such as web browsing, email, telephony, streaming multimedia and other traffic that is sent in packets.

TMD 106 may receive a request for access to a resource from client device 102. TMD 106 may be configured, in part, to determine whether the end-user of client device 102 is authentic and/or authorized to access the resource. TMD 106 may determine whether the end-user is authorized to access the resource based on a variety of conditions, including, but not limited to a type of client device being employed by the end-user; the software installed on the client and its security parameters; a time of day of the request; a type of request such as whether the request is a read-only request, a modify request, a delete request; a number of times the end-user has requested access to the resource; a number of times the request has been accessed over a period of time, total number of aggregate requests for the resource; or the like.

In any event, TMD 106 may then, based in part, on this determination select a server from servers 108-110 to receive the request, deny access to the request, flag the request for additional processing or special treatment such as verbose logging, intrusion detection analysis, or virtually any of a variety of other actions. For example, based on the request, and/or a client authorization, a determination may be made as to whether to secure a network connection, or the mechanism, including the level of security, to use in securing the network connection. This may be done, example, by causing the communication with the server to be encrypted using SSL or the like, causing the communication with the client to be encrypted using SSL (and STARTTLS if appropriate), or by causing a higher grade encryption to be used.

TMD 106 may determine authentication, authorization, access permissions, or the like by performing a deep packet inspection and/or extraction from a received packet or packets associated with the request. Deep packet inspections enable extractions of various information in either a passive mode or an active mode with respect to interacting with the client itself, with TMD 106 using the extracted information to enable access to a resource, direct the traffic towards a resource, or even deny access. Active mode in this respect uses a query mechanism, such as described in this specification, to request information from the client.

Deep packet inspection and the generation of criteria is described in more detail in U.S. patent application Ser. No. 10/385,790, filed Mar. 10, 2003, and entitled "Method and System for Managing Network Traffic," which is hereby incorporated by reference. Briefly, however, deep packet inspection enables TMD 106 to examine contents of a packet or packets associated with virtually any layer of the OSI layered protocol, above the network layer (layer 3). For example, deep packet inspections enable TMD 106 to examine an HTTP request, an HTTPS request, Secure Socket Layer (SSL) protocol data, a Session Initiation Protocol (SIP) request, a request for an HTML page, a request including a Uniform Resource Locator (URL), eXtensible Markup Language (XML) content, information that identifies a user, a cookie, application specific information, or the like. Deep packet inspection may include recognizing when a request spans two or more packets and examining content that spans multiple packets. It may, for example, include extracting and examining data within an HTTP header or data within HTTP content.

Moreover, inspection may include examining a variety of credential information, including FTP passwords, XML stream authenticators, database authenticators, form-based authenticators, application-cached credentials, encrypted cookies, fields within a digital certificate. In one embodiment, credential information may be received in the header or data portions of a single TCP SYN packet, or an HTTP request. Credential information may be received in packets exchanged during an SSL handshake. In another embodiment, credential information may be obtained by employing a combination of authentication mechanisms, authentication sources, credential types, or the like.

In one embodiment, a deep packet inspection mechanism provides syntax for a set of rules that enable the creation of event criteria for making various access and/or routing determinations based, in part, on data within virtually any TCP, UDP, or IP communication, or the like, including combinations of communications employing one or more network protocols. The event criteria may include conditional commands and event control instructions that enable one to perform actions based on specified conditions.

The rule syntax provides the ability to examine portions of data, such as may be described by offsets and lengths of data, with respect to the TCP, UDP, HTTP payload, or the like. This examination includes supporting arbitrary expressions, including full access to protocol headers, such as TCP, as well as TCP/UDP content, and application layer data of the OSI layered protocol. For example, event criteria may include a rule command, "HTTP::cookie <name>," that indirectly causes received data to be buffered. In processing this reference, TMD 106 may buffer more than one packet, to extract the data corresponding to the HTTP cookie. In one embodiment, the number of packets that are buffered is restricted to the number of packets required to identify the referenced data. In another embodiment, the number of packets that are buffered is selectable based on a number of packets, number of bits, a request to access one or more symbolic variables, and the like.

The rule syntax further enables examination of data from a first layer of the OSI layered protocol, and a second layer of the OSI layered protocol of the packet, where the first and second layers are from any of the OSI layers above the network layer of the OSI layered protocol. The rule syntax enables formation of event criteria that includes examination of data from at least one layer of the OSI layered protocol, at least two different layers, and virtually any combination of data from one or more layers.

Moreover, the rule syntax may be implemented using virtually any programming, and/or scripting language that enables dynamic rule creations, including the Tool Command Language (Tcl) scripting language, the Aho Weinberger Kernighan (AWK) language, the Practical Extraction Report Language (PERL), or the like.

In one embodiment, the rule syntax enables access to one or more symbolic variables. Some of the variables may represent data that are available in the IP packet header, HTTP protocol header, or the like. The following table illustrates one embodiment of a non-exhaustive set of rule commands that are available to obtain such credential data. Moreover, the following table is not intended to be restrictive, and other sets of rule commands may be employed without departing from the scope or spirit of the invention.

| | |
|---|---|
| HTTP::header <name> | Returns value of the http header named <name>. |
| HTTP::username | Returns the user name part of the HTTP basic authorization. |
| HTTP::password | Returns the password part of the HTTP basic authorization. |
| HTTP::method | Returns the type of HTTP request method. |
| HTTP::version | Get the HTTP version of the request or response. |
| HTTP::uri | Get the complete uri of the request. |
| HTTP::payload | Returns the content collected so far by HTTP::collect. |
| HTTP::cookie <name> | Gets the cookie of the given name. |
| HTTP::cookie decrypt <name> <passphrase> <data> | Decrypt the cookie value for the given cookie using a key generated from the pass phrase. |
| SSL::cert <index> | Returns the index-th X509 SSL certificate in the peer certificate chain, where index is a value greater than or equal to zero. A value of zero denotes the first certificate in the chain, a value of one is the next, etc. |
| SSL::cert issuer <index> | Returns the issuer certificate of the index-th X509 SSL certificate in the peer certificate chain, where index is a value greater than or equal to zero. A value of zero may denote the first certificate in the chain, a value of one is the next, etc. |
| SSL::cipher name | Returns the current SSL cipher name using for format of OpenSSL's SSL_CIPHER_get_name( ). |
| SSL::cipher version | Returns the current SSL cipher version using for format of OpenSSL's SSL_CIPHER_get_version( ). |
| SSL::cipher bits | Returns the number of secret bits used by the current SSL cipher using for format of OpenSSL's SSL_CIPHER_get_bits( ). |
| TCP::remote_port | Returns the current context's remote TCP port/service number. |
| TCP::local_port | Returns the current context's local TCP port/service number. |
| TCP::client_port | Returns the client's TCP port/service number. |
| TCP::server_port | Returns the server TCP port/service number. |
| TCP::payload | Returns the collected TCP data content. |
| UDP::remote_port | Returns the current context's remote UDP port/service number. |
| UDP:local_port | Returns the current context's local UDP port/service number. |
| UDP::client_port | Returns the client's UDP port/service number. |
| UDP::server_port | Returns the server UDP port/service number. |
| UDP::payload | Returns the current UDP payload content. |

To employ the event criteria generated from the rule syntax, one typically identifies the element or elements, in a packet to be used. This may be achieved, for example, by employing a filter on the output of tcpdump, or employing a network protocol analyzer to examine packets on the wire, and the like. Tcpdump is a utility used for examining header fields within packets, and is described in RFC 1470, available from the IETF. However, the invention is not so limited and virtually any mechanism may be employed, without departing from the scope of the invention. Moreover, TMD 106 may employ a process substantially similar to that described below in conjunction with FIG. 3 to perform at least some of its actions described above.

Controller 112 may include virtually any networked device that is configured to provide rule syntax and other instructions to TMD 106 for use in managing access to a resource. Controller 112 may for example, include security devices, such as intrusion detection or prevention devices, firewalls, proxies, gateways, system administration devices, or the like. Devices that may operate as controller 112 include personal computers desktop computers, multiprocessor systems, microprocessor-based or programmable consumer electronics, network PCs, servers, and the like.

Controller 112 may be configured, for example, to determine which one or more credentials should be requested, a level of security to be enforced, or the like. Controller 112 may make any of these determinations in response to events that occur or conditions that are met. Controller 112 may, for example, detect a suspicious activity, and send a request, one or more rules, or the like, to TMD 106 to vary its level of credential checks. Controller 112 may provide such directions automatically, or even through a manual interaction. The conditions that result in Controller 112 sending instructions to the TMD 106 may be the occurrence of a single event or multiple events occurring over a period of time. The conditions may include the type, content, or quantity of incoming requests. The conditions may include status conditions of one or more servers. The condition may include any one or more of these or other criteria being met.

Controller 112 may also request that at least a portion of a credential be provided to another device, such as servers 108-110, or even controller 112. The other device may then employ the provided portion of the credential for any of a variety of reasons, including providing access to another resource, enable logging of events, or the like. The other device may provide Controller 112 with information that is used in making authentication and authorization decisions.

An administrator may employ the mechanisms of the invention by creating rules described herein and installing the rules on controller 112. In one embodiment, an administrator installs at least a portion of the rules on TMD 106. An administrator may employ a variety of mechanisms to modify configured rules.

The invention is not constrained to providing requests and the like to TMD 106 through controller 112, however. Thus, TMD 106 may also receive directions from virtually any device, including servers 108-110, or the like. For example, TMD 106 may receive rules, or other criteria from at least one server, indicating which authentication policy, method, and/or credentials to employ. TMD 106 may receive rules or other criteria from another TMD, wherein the other TMD is on the same LAN as TMD or is accessed across network 105. Such communications may be performed in an out-of-band process, or even in-band, as part of a process that TMD 106 may employ in determining access to a resource.

Illustrative TMD Environment

Figure 2:
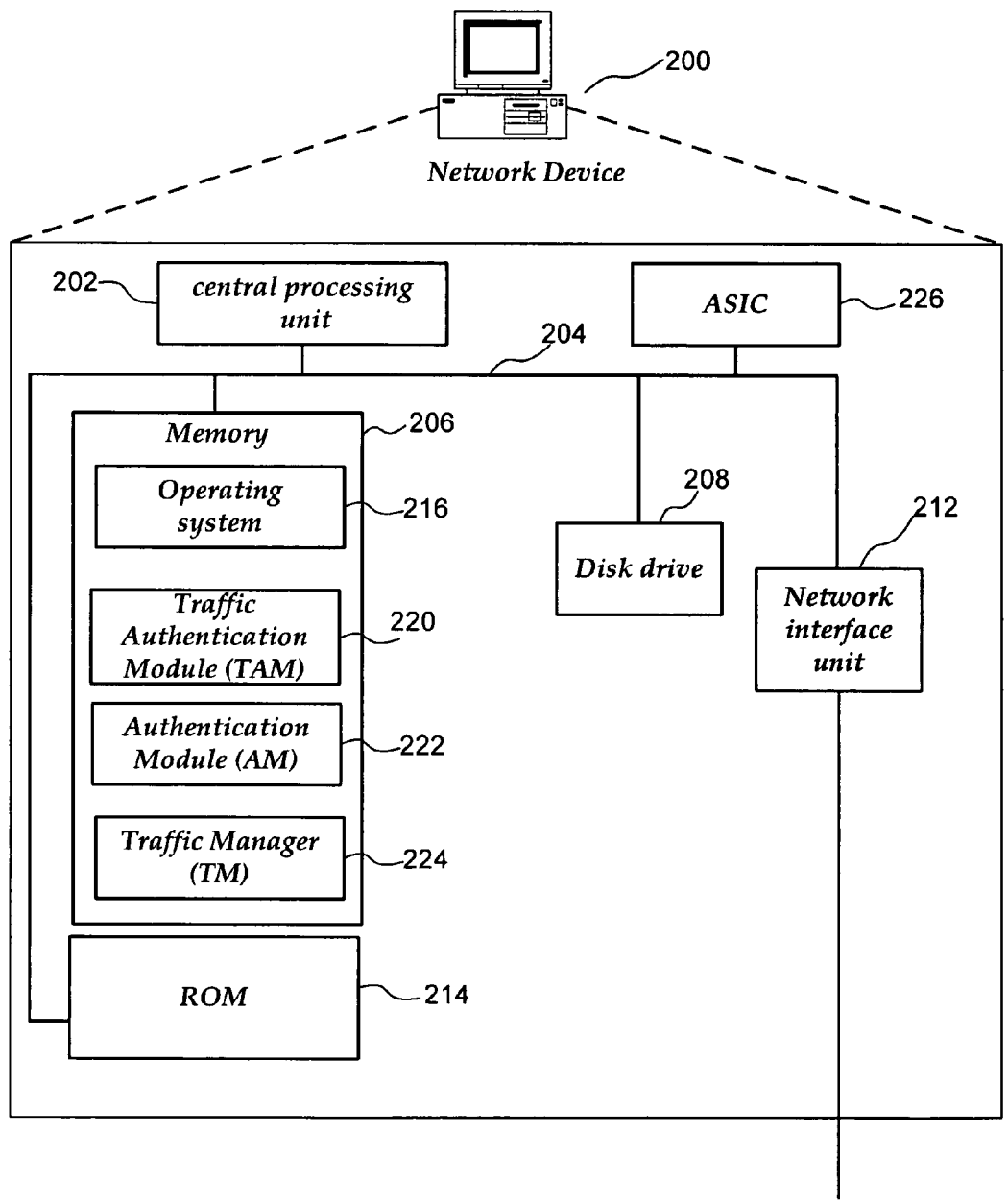
FIG. 2 shows one embodiment of a network device that may be included in a system implementing the invention.

FIG. 2 shows an exemplary network device 200 that may operate as TMD 106 of FIG. 1. It will be appreciated that not all components of network device 200 are illustrated, and that network device 200 may include more or less components than those shown in FIG. 2.

As illustrated in FIG. 2, network device 200 includes a central processing unit (CPU) 202, mass memory, and a network interface unit 212 connected via a bus 204. Network interface unit 212 includes the necessary circuitry for connecting network device 200 to various networks, including network 105 of FIG. 1, and is constructed for use with various communication protocols including the TCP/IP and UDP/IP protocol. Network interface unit 212 may include or interface with circuitry and components for transmitting messages and data over a wired and/or wireless communications medium. Network interface unit 212 is sometimes referred to as a transceiver, Network Interface Card (NIC), or the like.

In one embodiment, network device 200 includes one or more Application Specific Integrated Circuit (ASIC) chip 226. Although not illustrated, in one embodiment, ASIC chip 226 may reside on a daughter board rather then being connected to bus 204. As shown in FIG. 2, network interface unit 212 may connect to bus 204 through at least one ASIC chip. ASIC chip 226 can include logic that enables at least some of the actions of network device 200. For example, in one embodiment, ASIC chip 226 can be employed to perform packet processing functions on incoming and/or outgoing packets. In one embodiment, network device 200 includes one or more field-programmable gate arrays (FPGA) (not shown), instead of, or in addition to, ASIC chip 226. A number of actions for the network device can be performed by ASIC chip 226, an FPGA, CPU 202 with instructions stored in memory, or any combination of actions performed by the ASIC chip, FPGA, and CPU.

Computer storage media may include volatile and nonvolatile, removable and non-removable media implemented in any method or technology for storage of information, such as computer readable instructions, data structures, program modules or other data. Examples of computer storage media include RAM 206, ROM 214, EEPROM, flash memory and/or any other memory architecture, CD-ROM, digital versatile disks (DVD) and/or any other optical storage, magnetic cassettes, magnetic tape, magnetic disk storage and/or any other magnetic storage devices, and/or any other medium that can store information that can be accessed by a computing device.

Network device 200 may also include an input/output interface (not shown) for communicating with external devices or users.

Network device 200 can be implemented as one or more "blades" where the term "blade" refers to one of multiple electronic circuit boards or cards that are installed in a hardware chassis with a backplane. An exemplary blade may include one or more processors, volatile and non-volatile memory, interfaces suitable for communicating information to and from the blade, and other components for enabling the operation of one or more applications. A blade may also include a specialized interface for the backplane and other interfaces, such as a USB port, FIREWIRE port, serial port, RF interface, IR interface, Ethernet interface, IDE controller, and the like. An application running on a blade may employ any of these interfaces to communicate information to other applications running on other blades and/or devices coupled to the blade server. Network device 200 can also be implemented as a combination of blades and additional components in the chassis.

The mass memory generally includes random access memory ("RAM") 206, read-only memory ("ROM") 214, and one or more permanent mass storage devices, such as hard disk drive 208. The mass memory stores operating system 216 for controlling the operation of network device 200. The operating system 216 may comprise an operating system such as UNIX, LINUX™, or Windows™. In one embodiment, the mass memory may store program code and data for implementing traffic manager (TM) 224, authentication module (AM) 222, and traffic authentication module (TAM) 220.

TM 224 may be configured to receive a request for a resource and send the request to TAM 220 for authentication to proceed, and/or additional instructions on how to handle the request. Based on the authentication response and/or the additional instructions, TM 224 may direct the request to a server, deny the request, provide a message to the requestor, or the like. TM 224 may, for example, direct the request based on a variety of criteria, including a load-balancing mechanism, a type of request, or the like.

TAM 220 may receive a request for a resource from TM 224. TAM 220 may then perform a deep-layer inspection of the request, including at least one packet associated with the request, to extract a credential. In one embodiment, the credential includes a username and/or a password. In another embodiment, the credential includes a digital certificate or signature. In yet another embodiment, the credential includes a Kerberos ticket. In yet another embodiment, the credential includes a Security Association Markup Language assertion. In yet another embodiment, the credential includes an ephemeral or two-factor security token such as an RSA SecurID. In yet another embodiment, the credential includes an IPSec security association. However, TAM 220 is not constrained to extracting merely credential information, and TAM 220 may extract virtually any information from the request, or even subsequent communications from a requestor. Moreover, TAM 220 may extract information from virtually any OSI layer above the network layer in the request or subsequent communications.

TAM 220 may further determine that the request and/or subsequent communications do not include sufficient information to make an authentication, authorization, and/or access determination, and therefore, TAM 220 may enable communications with the requestor seeking the additional information. In one embodiment TAM 220 may enable a webpage, form, or similar query mechanism to be employed to request the additional information. The request may be automatically answered, for example, by the client device, or require an input from an end-user of the client device. Automated answers may include, for example, an HTTP authentication credential cached by the client device's web browser, a client certificate such as an SSL certificate, FTP login credentials, or the like, or a field that may be pre-populated with information that might be cached by the client device.

TAM 220 may then provide the credential information to AM 222 for an authentication, authorization, and/or access determination to be performed. In one embodiment, TAM 220 may provide the credential information to AM 222 through a series of communications, such as a series of questions and responses, or the like.

TAM 220 may also receive a request from another device or component to vary what information may be employed for use in a credential, and/or what other access determinations may be performed. Thus, for example, TAM 220 may receive a request to increase a level of security. For example, one level of security may use a username/password in a credential, while a higher level of security may use a digital certificate either instead of, or in addition to, the username/password. Another request may specify that a second password is to be used in addition to a username/password. Moreover, TAM 220 may be arranged to request additional information and make additional access determination based on the credential and/or additional information. Thus, in one embodiment, TAM 220 may receive an authentication/authorization, access determination from AM 222, but proceed to perform additional determinations based on additional rules. For example, a request may be authorized based on a username/password, but TAM 220 may extract information about the client such as whether it is another website, a user, other the like, and make additional access determinations. A request specifying a change in the credential information to be used may further designate the scope of the change. The scope of the change refers to the extent of when the new credential specification is to be used. The scope may specify, for example, whether the credential specification is to be applied for one request, for requests from a particular user or client or group of users or clients, for requests for a designated time period, for a particular type of request, or for any combination of these parameters.

In addition, TAM 220 may be arranged to employ deep packet layer extractions based on a variety of rules to extract credentials, and/or other information that may be provided to another device, such as a controller, logger, server, or the like. For example, in one embodiment, TAM 220 may provide the credential to an LDAP server to enable access to additional resources by the requestor. In another embodiment, TAM 220 may receive additional credentials from an external authentication server in response to a query regarding the client.

Moreover, TAM 220 may receive rules, events criteria, or the like, from another device that enables TAM 220 to modify the specification of information that is extracted from a packet flow, the determinations to be performed, and the responses to be made based on the determinations. Thus, TAM 220 provides a convenient mechanism for dynamically modifying determinations and actions taken based on deep packet extractions of information in a packet flow. In one embodiment, TAM 220 may employ a process such as described below in conjunction with FIG. 3 to perform at least some of its activities.

AM 222 may include virtually any mechanism arranged to perform an authentication, authorization, and/or access determination, including a Pluggable Authentication Module (PAM), an Apache Authentication/Authorization/Access (AAA) module, or the like. Although AM 222 is illustrated as residing within network device 200, the invention is not so constrained. For example, AM 222 may reside on another network device, without departing from the scope or spirit of the invention.

Generalized Operation

Figure 3:
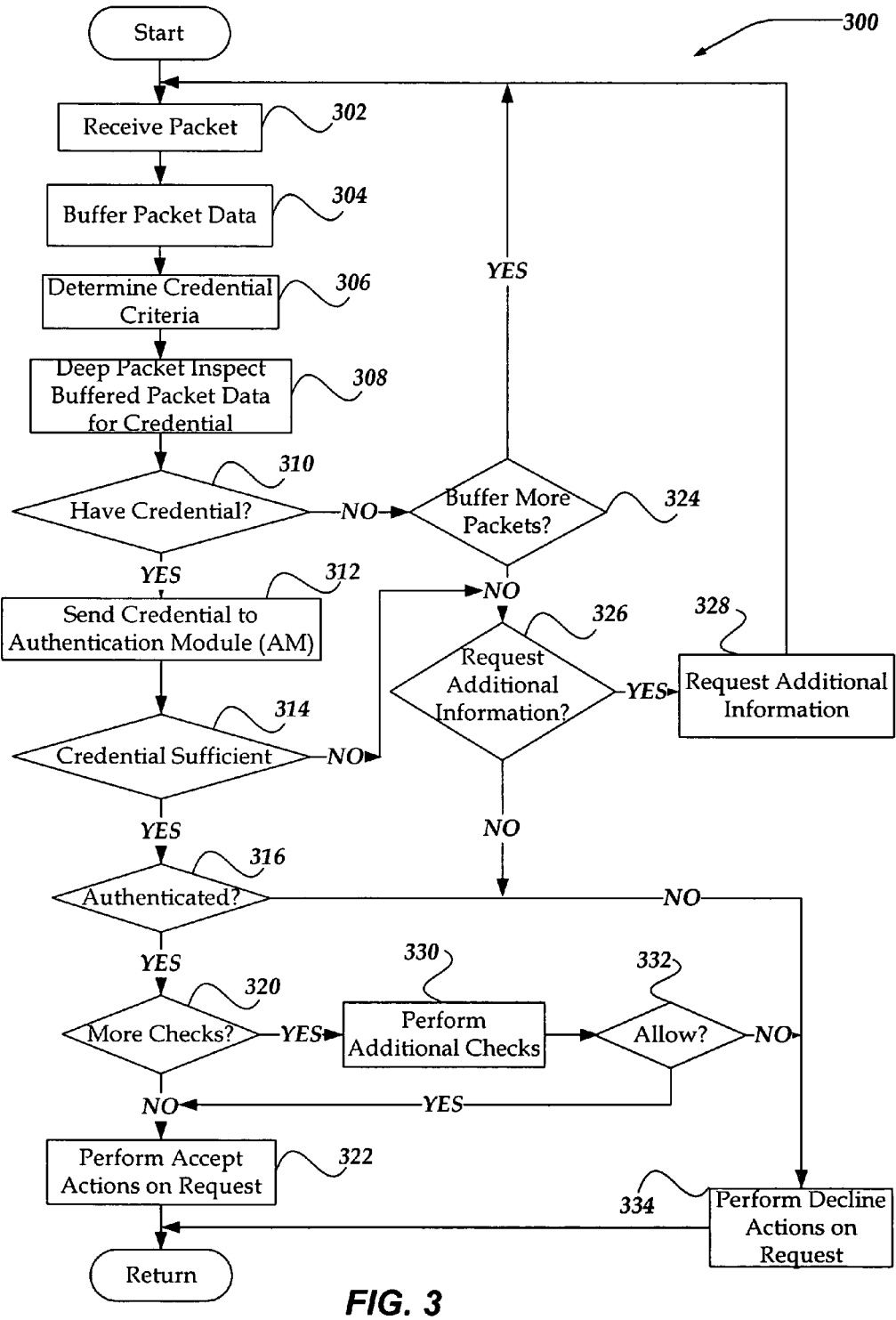
FIG. 3 illustrates a logical flow diagram generally showing one embodiment of a process for managing access to a resource using deep packet credential extractions, in accordance with the present invention.

The operation of certain aspects of the invention will now be described with respect to FIG. 3. FIG. 3 illustrates a logical flow diagram generally showing one embodiment of a process for managing access to a resource using deep packet credential extractions. Process 300 of FIG. 3 may be implemented within TMD 106 of FIG. 1, for example.

Process 300 begins, after a start block, at block 302 when a request for a resource is received. Typically, the request is received over a network using TCP/IP, UDP/IP, or the like. In one embodiment, the request further employs HTTP; however, the invention is not so constrained. Moreover, the request may be associated with at least one network packet.

Processing continues to block 304, where the received packet may be buffered, or otherwise stored in a temporary store. Processing flows next to block 306, where credential criteria may be determined. It is important to note, that block 306 may also be performed prior to receiving a packet, or even concurrently, with receiving the packet. The credential criteria may be received from another device, such as a controller, a server, a system administrator, or the like. In one embodiment, the credential criteria includes an indication that username/password is to be evaluated to determine authorization to access the requested resource. In another embodiment, the credential criteria may include an indication to employ a digital certificate. Moreover, the credential criteria may indicate that information for the credential may be extracted from a cookie, from an OSI layer seven application payload such as an XML document, an HTTP form, obtained during a Secure Socket Layer (SSL) handshake, or the like. The credential and other information may be sought from a first layer and/or a second layer of the OSI layered protocol. For example, the credential and/or other information may be sought from buffered data that indicates the packet is a UDP packet and includes particular Network File System (NFS) application data or the like.

Moreover, in one embodiment, block 306 may also be configured to establish additional information that is to be extracted, such as information about the requestor's network address, or the like. Moreover, the credential criteria may be formatted using the deep-packet inspection rules syntax described above.

Process 300 flows next to block 308, where the credential criteria are employed to inspect the buffered packet to extract credential information. Continuing to decision block 310, a determination is made whether the buffered packet(s) include the sought credential information, and other additional information. The buffered data may not include the credential and/or other information for a variety of reasons. For example, the credential criteria may seek a specific data item, such as a specific HTTP cookie, or the like. HTTP cookies may span more than one packet. As such, additional packets may need to be buffered to determine whether the credential criteria, and/or other information are available. Thus, if it does not, processing branches to decision block 324; otherwise, processing flows to block 312.

At block 312, the extracted credential information may be provided to an authentication module, including those described above. In one embodiment, the credential information may be provided to a plurality of authentication modules. How the information is provided may be dependent upon the interface with the authentication module. For example, in one embodiment, the information may be provided to the authentication module through a series of question/response 'handshakes.' Processing then flows to decision block 314, where a determination may be made whether the authentication module received sufficient credential information to make a determination. This situation may arise, for example, where the authentication module seeks a particular input that was not available within a received packet. Thus, although, a credential may be been determined to have been received, at decision block 310, it may not have been sufficient for the authentication module. In any event, if insufficient credentials are received, processing flows to decision block 326; otherwise, processing flows to decision block 316.

At decision block 316, a determination is made whether a response from the authentication module indicates that the request is authenticated, authorized, and/or otherwise enabled for access to the requested resource. If the request is declined based on the determination, processing flows to block 334; otherwise, processing continues to decision block 320. In one embodiment, decision block 316, may result in acknowledging a result of the determination, but still flow to decision block 320, regardless of the results.

At decision block 320, a determination is made whether to perform additional access determinations. Such determination may include any of a variety of activities. In any event, if more determination checks are to be performed, processing flows to block 330; otherwise, processing flows to block 322, where virtually any action may be performed based on accepting the request for access to the resource. Such actions may be dynamically determined, or even predetermined, and include, enabling access to the resource, sending the request to be load-balanced, or otherwise distributed to a selected server, or the like. In one embodiment, at least a portion of the credential and/or other information extracted from the flow of packets between the requestor may be provided to another device. In another embodiment, the request may be modified or replaced before it is sent to another device. This may include full proxying of TCP/IP or similar protocols; proxying between otherwise incompatible protocols; removing, encrypting, modifying, or obscuring sensitive credentials or other information in the client request. In yet another embodiment, such actions may also be taken on the responses being returned to the client. Upon completion of block 322, process 300 may then return to a calling process to perform other actions.

At block 330, additional access determinations, and/or other checks may be performed based on the credentials and/or additional information obtained. Processing next flows to decision block 332, where a determination is made based on additional access determinations, and/or other checks whether to allow access to the requested resource. If access is to be allowed, processing flows to block 322; otherwise, processing flows to block 334.

Returning to decision block 310, if it is determined that a credential is not obtained, processing flows to decision block 324, where a determination is made whether to buffer more packet data from another packet in a flow of packets associated with the request. The determination to buffer more packet data may be based in part on an implicit determination. For example, where it is known that the credential criteria may span several packets, such as in application data, cookies, an SSL handshake that may span multiple communications and/or packets, or the like, process 300 may automatically decide to loop back to get a sufficient number of packets to be able to make an adequate determination that the credential and/or other information is received. Thus, if it is determined to seek more packets, process 300 loops back to block 302; otherwise, processing flows to decision block 326. In one embodiment, blocks 306, 308, and 310 are not explicitly used in the aforementioned loop. One or more of these steps may occur after some predetermined event, e.g., an HTTP request header block has been fully received and buffered.

At decision block 326, a determination is made whether to provide a specific request for additional information. This may arise, for a variety of reasons. For example, it may be determined that some credential information is not provided unless it is specifically requested, or credential information might only be requested based on additional criteria not available early during communication with the client. If no more information is to be requested, processing flows to block 334. However, if more information is to be requested, processing flows to block 328, where the additional information is requested.

The request for additional information at decision block 326 may be at any of a variety of levels, including a web form, page, or the like, requesting information from an end-user. The request may also be at a lower OSI layer where the information may be provided through a network communication, or the like. In one embodiment, the request may result in a series of requests to be performed. In any event, upon completion of block 328, processing loops back to block 302.

At block 334, any of a variety of actions may be performed as a result of declining the request, including providing a message to the requestor, denying access to the resource, providing a restricted access to at least a portion of the resource, redirecting the request to another resource, or the like. In one embodiment, at least a portion of the credential and/or other information extracted from the flow of packets between the requestor may be provided to another device. Upon completion of block 334, the process may return to another process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A traffic management device for managing a communication between a client and a server, comprising:
    a transceiver that receives packets from the client; and
    a processor programmed to perform actions including:
        receiving from the client a request for a resource;
        extracting information from at least one packet associated with the request using a deep packet inspection;
        generating a credential from the extracted information;
        determining if access to the resource is allowable based, at least in part, on the credential, and if access is allowable, selecting at least one server based, in part, on a rule associated with the allowed access, and directing the request towards the selected server; and
        determining that the extracted information is insufficient to determine if the access to the resource is allowable, and based on the determination that the extracted information is insufficient, sending a request to the client for additional information to be extracted from a subsequent packet received from the client in response to the request for a further determination if the access to the resource is allowable; and if so, then enabling access to the requested resource.

2. The traffic management device of claim 1, wherein the credential comprises at least one of a username, a password, or a certificate.

3. The traffic management device of claim 1, wherein the extracted information comprises information exchanged during an Secure Sockets Layer (SSL) handshake.

4. The traffic management device of claim 1, wherein the extracted information comprises information extracted from a Session Initiation Protocol (SIP) request, an HyperText Markup Language (HTML) page, an application, a Uniform Resource Locator (URL), eXtensible Markup Language (XML) content, or a cookie.

5. The traffic management device of claim 1, wherein performing the deep packet inspection further comprises extracting information from at least two layers of the Open Systems Interconnection (OSI) protocol.

6. The traffic management device of claim 1, wherein requesting additional information from the client further comprises employing a query mechanism to determine at least one of a number of times the client requested access to the request over a period of time, or to request a security configuration of the client.

7. The traffic management device of claim 1, the actions further comprising:
    if access to the resource is unallowable, identifying the request for additional processing.

8. The traffic management device of claim 7, wherein additional processing includes at least one of verbose logging, or intrusion detection analysis.

9. The traffic management device of claim 1, the actions further comprising determining the information to extract based, in part, on a level of security.

10. The traffic management device of claim 9, wherein determining the information further comprises receiving direction to change the information to extract based, in part, on a change in a level of security.

11. The traffic management device of claim 1, wherein selecting the at least one server further comprises selecting the at least one server based on a load-balancing mechanism.

12. A method operating within a network device for managing a communication between a client and at least one server over a network, comprising:
    receiving from the client a request for a resource;
    extracting a credential from at least one packet associated with the request, the credential being from the at least one packet at an Open Systems Interconnection (OSI) application;
    determining if access to the resource is allowed based, at least in part, on the credential, and if access is allowed, selecting at least one server based, in part, on a rule associated with the allowed access, and directing the request towards the selected server; and
    determining that the extracted information is insufficient to determine if the access to the resource is allowable, and based on the determination that the extracted information is insufficient, sending a request to the client for additional information to be extracted from a subsequent packet received from the client in response to the request for a further determination if the access to the resource is allowable; and if so, then enabling access to the requested resource.

13. The method of claim 12, wherein extracting the credential further comprises performing a deep packet inspection of the at least one packet.

14. The method of claim 12, wherein extracting the credential further comprises extracting information from at least one of Secure Sockets Layer (SSL) protocol data, Hypertext Transfer Protocol (HTTP) data, Session Initiation Protocol (SIP) data, a Uniform Resource Locator (URL), eXtensible Markup Language (XML) data, or a cookie.

15. The method of claim: 12, wherein selecting at least one server based, in part, on the rule, further comprises selecting the server based on at least one of a type of client, a type of the request, a number of times the client has requested the resource, a number of times the resource has been requested over a period of time, or a total number of aggregate requests for the resource.

16. The method of claim 12, wherein the credential further comprises at least one of a password, an eXtensible Markup Language (XML) stream authenticator, a database authenticator, a form-based authenticator, or a certificate.

17. The method of claim 12, wherein requesting additional information further comprises employing a query mechanism to determine at least one of a software installed on the client or to request a security configuration of the client.

18. The method of claim 12, further comprising if access to the resource is not allowed, redirecting the request to another resource.

19. The method of claim 12, wherein extracting the credential further comprises using a programmable syntax for enabling a creation of event criteria usable in extracting the credential from at least one packet.

20. The method of claim 12, further comprising:
modifying a selection criteria to extract different information from the at least one packet usable to determine the credential.

21. The method of claim 12, wherein the selecting the at least one server based, in part, on the rule further comprises dynamically selecting the rule.

22. The method of claim 12, further comprising:
determining whether the credential is extracted from a first packet associated with the request;
if the credential is not extracted completely from the first packet, buffering additional packets associated with the request until the credential is completely extracted.

23. An apparatus for managing a communication between a client and a server over a network, comprising:
a transceiver to receive a request from the client for a resource over the network;
means for extracting a credential from at least one packet associated with the request;
means for determining if access to the resource is allowed based, at least in part, on the credential, and if access is allowed, selecting at least one server based, in part, on a rule associated with the allowed access;
means for determining that the extracted information is insufficient to determine if the access to the resource is allowable, and based on the determination that the extracted information is insufficient, means for sending a request to the client for additional information to be extracted from a subsequent packet received from the client in response to the request for a further determination if the access to the resource is allowable; and
program instructions that perform actions comprising directing the request towards the selected server.

24. The apparatus of claim 23, further comprising:
means for selecting different information to extract as the credential from the at least one packet, based, at least in part, on input from another device.

25. A traffic management device for managing a communication between a client and a plurality of servers, comprising:
a transceiver that receives packets from the client; and
a processor programmed to perform actions including:
receiving from the client a request for a resource;
extracting credential information from the request;
determining a level of authentication based on the credential information;
determining that the extracted information is insufficient to determine a level of authentication, and based on the determination that the extracted information is insufficient, sending a request to the client for additional information to be extracted from a subsequent packet received from the client in response to the request for a further determination if the extracted information is sufficient to determine a level of authentication; and
selecting a server based on the determined level of authentication.

26. The traffic management device of claim 25, wherein selecting the server comprises selecting the server to establish an increased level of security with the client.

27. The traffic management device of claim 25, wherein selecting the server comprises selecting the server to establish an Secure Sockets Layer (SSL) connection with the client.

* * * * *